E. W. STULL.
MOTOR CONTROL SYSTEM.
APPLICATION FILED AUG. 1, 1910.
1,017,270.
Patented Feb. 13, 1912.
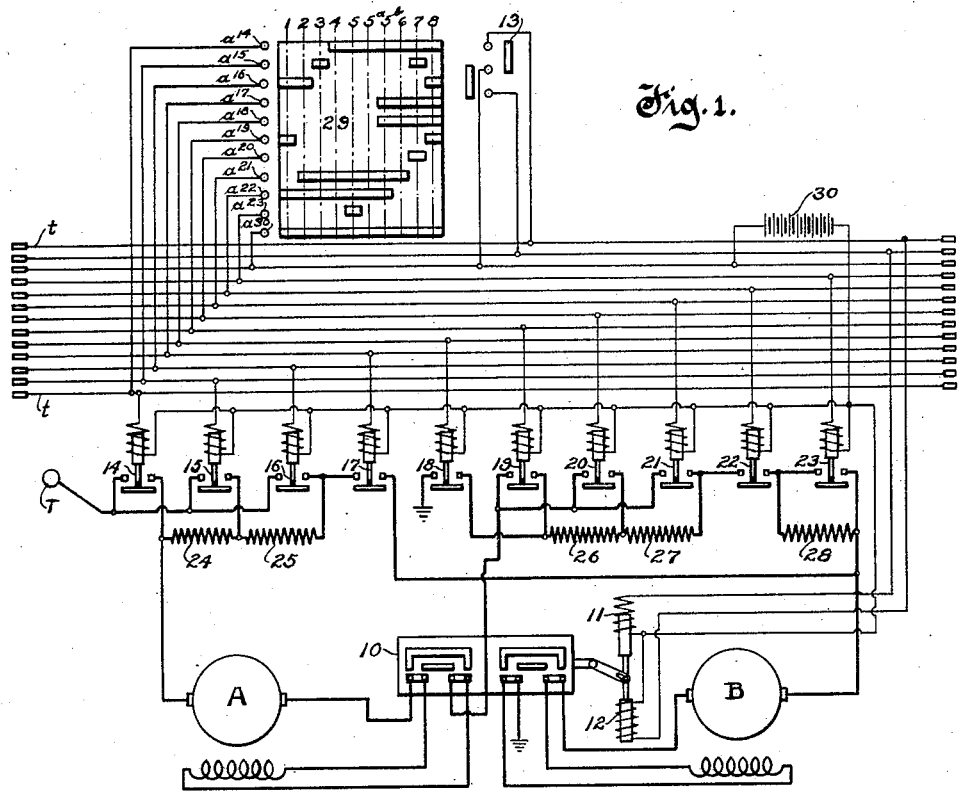
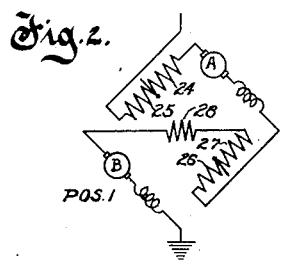
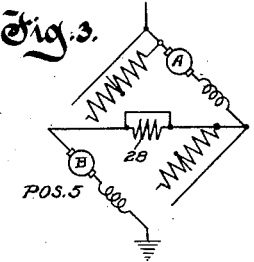
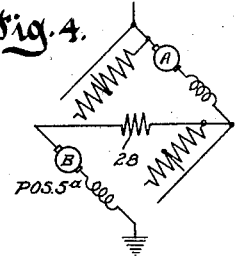
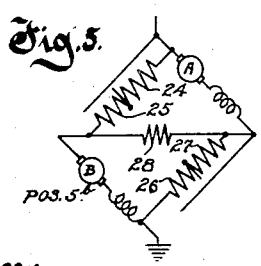
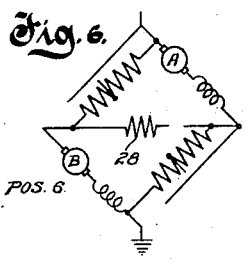
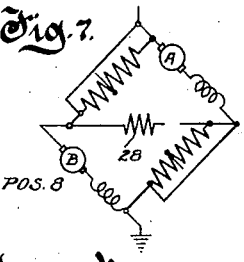
Witnesses
John L. Johnson
Chas. L. Byron
Inventor
Emmett W. Stull
By Chas. E. Lord
Attorney

UNITED STATES PATENT OFFICE.

EMMETT W. STULL, OF MILWAUKEE, WISCONSIN, ASSIGNOR TO ALLIS-CHALMERS COMPANY, A CORPORATION OF NEW JERSEY.

MOTOR-CONTROL SYSTEM.

1,017,270.  Specification of Letters Patent.  Patented Feb. 13, 1912.

Application filed August 1, 1910. Serial No. 575,024.

*To all whom it may concern:*

Be it known that I, EMMETT W. STULL, a citizen of the United States, residing at Milwaukee, in the county of Milwaukee and State of Wisconsin, have invented certain new and useful Improvements in Motor-Control Systems, of which the following is a full, clear, and exact specification.

My invention relates to systems of motor control.

One of the most convenient and efficient systems of series parallel control of motors is by the so-called "bridge" method; according to which, as usually practiced, two motors or groups of motors are first connected in series with each other and with two resistances, the two resistances are cut out, the two resistances are then connected in series with the two motors or groups of motors respectively, each resistance being in parallel with the other motor or group of motors than the one with which it is connected in series, making the connections at this stage similar to a Wheatstone bridge, the series or "bridge" connection between the two motors or groups of motors is broken, and the resistances are again cut out. By this system the change from series to parallel is made without cutting either motor out of circuit. Since the opposition to the flow of current offered by the motors is variable, depending upon the speed of the motors, while that offered by the resistances is substantially constant, there must be current in the bridge connection between the two motors at the moment such connection is broken, unless this happens when the motors are at a definite speed. This current may be large enough to do considerable damage to the contacts controlling such connection at the moment such connection is broken.

The main object of my invention is to reduce this flow of current through the bridging connection, thus preventing destruction of the contacts controlling such connection. This is done by having the bridge connection of comparatively high resistance at the moment such connection is broken.

The various novel features of my invention will be apparent from the description and drawings, and will be particularly pointed out in the claims.

Figure 1 is a diagram showing my invention applied to a remote control system for the series-parallel bridge control for two motors; and Figs. 2, 3, 4, 5, 6, and 7 are simple connection diagrams showing the connections of the several motors and resistances for positions 1, 5, $5^a$, $5^b$, 6, and 8 respectively.

The two motors A and B, having the usual field windings, have their direction of rotation controlled by a main reversing switch 10 operated by solenoids 11 and 12 which are controlled by a master reversing switch 13 having forward and reverse positions. The two motors have their speed controlled by a number of solenoid-operated switches 14 to 23 inclusive, which control the connections of the motors to the line, to each other, and to resistance sections 24 to 28, and are themselves controlled by a master controller 29. The solenoids 11 and 12 and the operating solenoids of the switches 14 to 23 inclusive are supplied with current from any convenient source, such as a battery 30. The master controller 29 is of the drum type, having contact fingers $a^{14}$ to $a^{23}$ inclusive and $a^{30}$, controlling respectively the connections to the operating solenoids of the switches 14 to 23 inclusive and to the battery 30. These connections may be through train wires $t$, if desired, so that the motors on several cars may be controlled by the same master controller.

With the master reverser 13 moved to either forward of reverse position to energize either the solenoid 11 or 12 to move the main reverser 10 to the proper position, the speed of the motors is controlled by the master controller 29. Moving this master controller to first position causes the closing of the switches 16, 19, and 22, thus connecting the motors A and B in series with all the resistance sections 24 to 28 inclusive, as illustrated in Fig. 2. Moving the master controller 29 to the second position causes the closing of the switch 21, thus causing the cutting out of the resistance sections 26 and 27. This movement also preferably causes the opening of the switch 19. Movements of the master controller 29 to the third, fourth, and fifth positions cause the closing of the switches 15, 14, and 23 respectively to cut out the resistance sections 25, 24, and 28 respectively, leaving the motor connected directly in series with all the resistance cut out, as illustrated in Fig. 3. When moved to positions 3 and 4 respectively, the master controller also preferably causes the opening of the switches 16 and 15 respectively. Position 5 is the final series position. As the master controller is now moved forward to the first parallel position, position 6, it passes through two intermediate positions 5ª and 5ᵇ. In position 5ª the switch 23 is caused to drop to open the short-circuit around the resistance 28, as indicated in Fig. 4. In position 5ᵇ the switches 17 and 18 are caused to close, the first to connect the resistance sections 24 and 25 between the trolley T and the trolley terminal of the motor B or to connect together the trolley terminals of the two motors through such resistance sections, and the second to connect the resistances 26 and 27 between the ground terminal of the motor A and the ground or to connect together the ground terminals of the two motors through such resistances. This condition is indicated in Fig. 5. The several parts are now connected in the form of a Wheatstone bridge, with the resistance 28 in the bridge wire. Current will flow through the bridge connection, including the resistance 28, in one direction or the other according as the speed of the motors is such as to make the trolley terminal of the motor B or the ground terminal of the motor A at the higher potential, but because of the resistance 28 this current is much less than it would be if the resistance 28 were omitted. As the controller 29 is now moved forward to position 6, the switch 22 is caused to drop to break the bridge connection, leaving the motors A and B connected in series respectively with the sets of resistance sections 26 and 27, and 24 and 25 respectively, as illustrated in Fig. 6. The current flow interrupted by this opening of the switch 22 is so small, because of the resistance 28, that little or no damage is done to the contacts of the switch as it opens. Moving the master controller 29 forward to positions 7 and 8 causes the closing of the switches 15 and 20, and 16 and 19, respectively, thus cutting out first the resistance sections 24 and 27 and then the resistance sections 25 and 26. This leaves the two motors each connected directly across the circuit, as illustrated in Fig. 7. When the master controller is moved backward, the operation is just reversed.

I have shown my invention as applied to a simple form of remote control system, but it is equally applicable to more complicated systems, and also to systems from which the remote control idea is omitted. Many other changes may be made in the precise arrangement shown and described, and all such which do not involve a departure from the spirit and scope of my invention I aim to cover in the following claims.

What I claim as new is:

1. In combination, two motors, resistances, and means for connecting said motors and all of said resistances in series with one of said resistances between two motors, for then cutting out part of the resistances but leaving the one between the two motors still in circuit, for then connecting the positive terminals of the two motors together through one and the negative terminals together through another of the cut out resistances, and for then breaking the series connection between the two motors.

2. In combination, a supply circuit, two motors, resistances, means for connecting the two motors in parallel with a resistance between the positive side of the supply circuit and the corresponding side of one motor, and another resistance in series between the negative side of the supply circuit and the corresponding side of the other motor, for then connecting the intermediate points between the two motors and their respective resistances to each through a third resistance, for then breaking the connection of each motor to the supply circuit through said first two resistances respectively, and for then connecting said first two resistances in series with said two motors and the third resistance.

3. In combination, a supply circuit, two electric motors, three resistances, and a controller for connecting said two motors and said three resistances all in series with one of said resistances between the two motors, for then cutting out two of said resistances but leaving the one between the two motors still in circuit, for then connecting the two cut out resistances respectively between the two sides of the supply circuit and the corresponding terminals of the motors not directly connected to them, and for then breaking the connection extending between the two motors through such first resistance.

In testimony whereof I affix my signature, in the presence of two witnesses.

EMMETT W. STULL.

Witnesses:
GEO. B. SCHLEY,
CHAS. L. BYRON.